July 15, 1941.  E. L. RIETZ  2,249,638

WHEEL

Filed July 8, 1939   2 Sheets-Sheet 1

INVENTOR
EDWARD L. RIETZ

BY Paul O. Pippel

ATTY.

July 15, 1941.                E. L. RIETZ                    2,249,638
                                WHEEL
                         Filed July 8, 1939            2 Sheets-Sheet 2
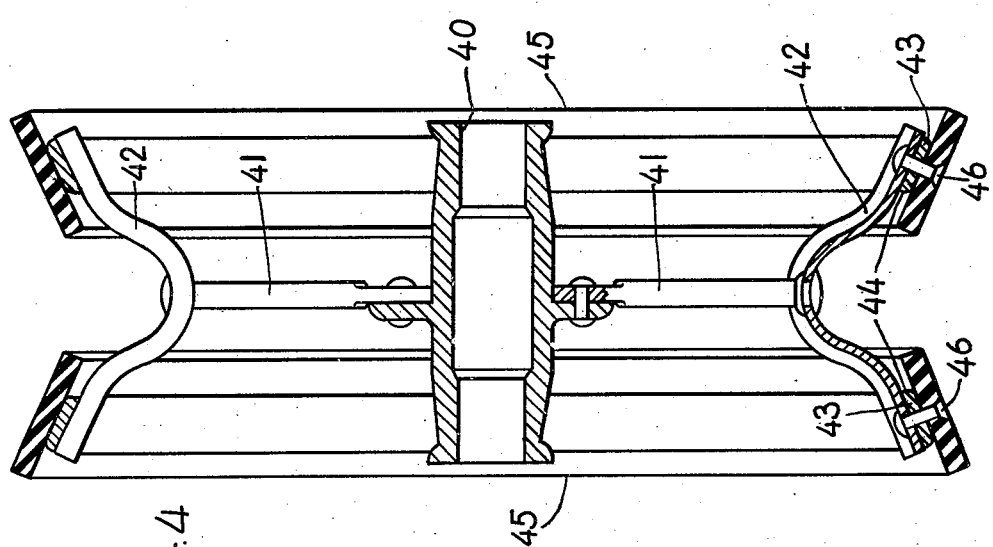
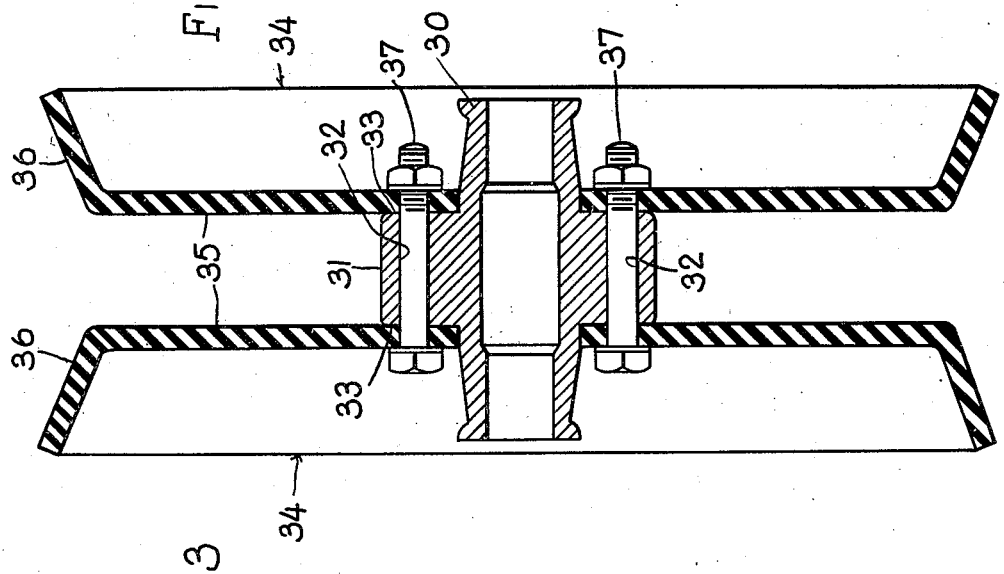
INVENTOR
EDWARD L. RIETZ
BY Paul O. Pippel
                ATT'Y.

Patented July 15, 1941

2,249,638

UNITED STATES PATENT OFFICE 2,249,638

WHEEL

Edward L. Rietz, Riverside, Ill., assignor to International Harvester Company, a corporation of New Jersey Application July 8, 1939, Serial No. 283,404

20 Claims. (Cl. 97—56)

This invention relates to a wheel and more particularly to an improved press-wheel of the type used in corn planters and the like.

The present invention contemplates the provision of flexible tread bands in the press wheels of corn planters and the like. The ordinary constructions using metal wheels have been found to contain numerous disadvantages reflected in inefficient operation of the planter. According to the present invention applicant has provided a press wheel having a flexible band preferably formed of rubber. The use of this band is attended with many advantages, among which are those incidental to a more desirable packing of the soil around the planted seed. In addition, the flexibility of the end material, of which the band or bands are formed, results in a wheel that is more easily kept free of accumulation of soil thereon. Still further, the flexibility of the tread is more readily adapted to irregularities in the soil, with the result that the planter is not subjected to the usual jolting present during the use of the planter with metal wheels.

The principal object of the invention, therefore, is to provide an improved press-wheel structure having a flexible tread preferably comprising axially spaced rubber tread bands or rings, each the section of a cone formed about the wheel axis.

It is an important object in one form of the invention to provide such flexible tread for an ordinary type of press-wheel.

In another form of the invention, it is an important object to provide a pair of flexible portions comprising integral wheel body portions and tread portions.

In another form, it is an important object to provide axially spaced tread portions integral with a center groove portion adapted to fit a tire-receiving portion included in the wheel structure.

Another object of the invention is to provide a variety of improved press-wheel structures which may be easily and quickly assembled and which attain desirable results during operation because of the flexibility of the tread portions.

These and other important objects will be more readily apparent from the following detailed description taken in conjunction with the accompanying sheets of drawings, wherein:

Figure 3 is a sectional view of another form of the invention, similar to that shown in Figure 1 but having a pair of wheel body parts formed integrally with a pair of tread parts; and, Figure 4 is another form of the invention, in which flexible tread portions are provided on a press-wheel structure of conventional construction.

Figure 1:
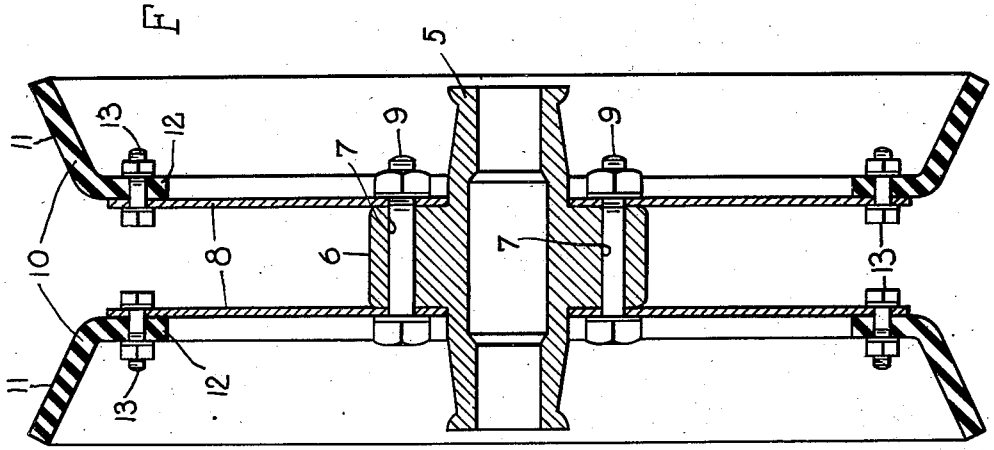
Figure 1 is a sectional view of one form of the invention wherein the wheel comprises a hub, a pair of axially spaced disks, and a pair of tread portions carried by the disks.

The press-wheel structure illustrated in Figure 1 comprises a central wheel part including a central hub 5 formed with an integral annular flange 6 having transverse bores 7 formed therein. A pair of axially spaced disks 8 are associated with the hub 5, being disposed respectively at opposite radial faces of the flange 6 and secured thereto by a plurality of bolts 9 passed through the transverse bores 7. The axially spaced disks 8 are preferably formed of metal and comprise together with the hub 5 a comparatively rigid wheel body.

The wheel structure is further provided with an annular tread part consisting of a pair of flexible tread portions 10 preferably formed as annular rubber tread bands or rings. Each band 10 consists of an outwardly radially and axially extending tread portion provided with an annular tread surface 11 formed as a section of a cone having the wheel axis as its axis. Each band 10 further includes an integral, radial flange portion 12 secured by a plurality of bolts 13 to the respective wheel body disk 8. Each band 10 consists wholly of flexible material, and comparative rigidity is imparted to each band in the vicinity of the flange 12 because of its association with its respective supporting disk 8. The annular tread portions or surfaces 11 of the bands retain their flexibility and the wheel structure is admirably adapted for its function in following the planter shoe or runner. The arrangement of the tread surface 11 is similar to the arrangement of metal and rigid rims or tread parts of an ordinary press wheel.

Figure 2:
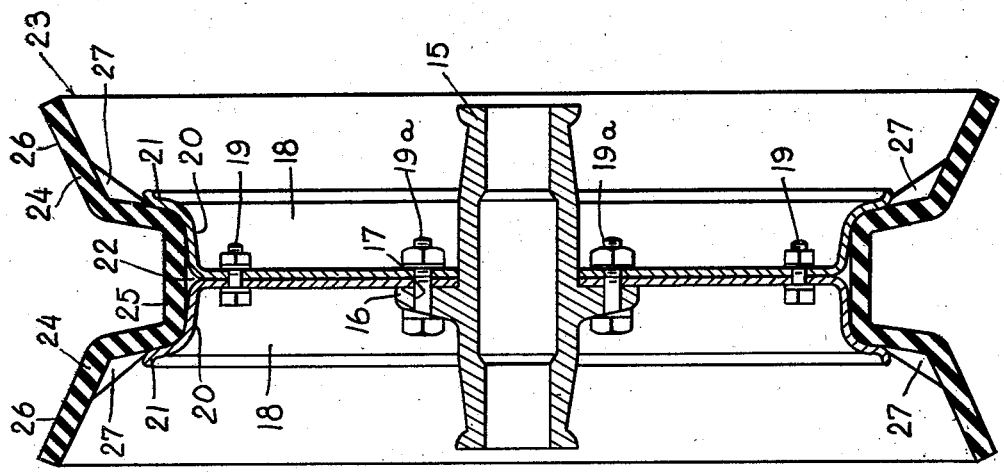
Figure 2 is a sectional view of another form of the invention in which the tread part is formed with a pair of axially spaced tread portions and an integral, central groove portion adapted to fit in a tire-receiving groove formed by a pair of separable disks carried by the wheel hub.

The wheel structure provided in another form of the invention and illustrated in Figure 2 comprises a central hub part 15 formed with an integral annular flange 16 which is provided with a plurality of transverse bores 17. A pair of separable disks 18 is removably secured together and to the flange 16 by a plurality of bolts 19 and 19a passed therethrough. Each disk 18 comprises an annular rim portion 20 extending axially outwardly and then radially upwardly to form an annular radial flange portion 21. When the two disk parts are secured together the portions 20, 21 form a central, annular rim or tire-receiving groove 22 for the purpose of receiving an improved tread part 23.

This tread part 23 is formed wholly of a flexible material, preferably rubber, and comprises a pair of axially spaced tread portions 24, generally in the form of rings, formed integrally with a central groove portion 25 of reduced diameter. This groove portion is received by and fits in the rim or tire-receiving portion 22 formed by the assembled disks 18, the disks 18 serving as the wheel body part of the press wheel structure. Each tread portion 24 is provided with an outer annular tread surface 26 the section of a cone formed about the wheel axis, the tread surfaces together simulating the rims of a conventional press wheel, and the part being generally V-shaped in cross-section; that is, the tread surfaces are disposed respectively at the opposite sides of a V. The tread part 23 further includes a plurality of reenforcing ribs 27 disposed respectively between the central grooved portion 25 and each axially outwardly extending tread part 24. These ribs serve to impart rigidity to the tread parts in the vicinity of the central portion 25, permitting the outer portions of the tread portions to retain their inherent flexibility, thus providing for desirable functioning of the wheel when used in conjunction with a planter or the like.

It will be noted that the tread part 23 is formed as a one-piece structure and the various parts thereof are of substantially uniform thickness, thus facilitating easy manufacture thereof in the formation of the tread portions or annular tread bands 24. The tread part may be easily mounted on or removed from the wheel body part formed by the disks 18. This may be done by stretching the part over the disks or by removing the bolts 19 to separate the disks. It will be further noted that the annular walls or flanges 21 of the disks extend radially a sufficient distance at the opposite sides of the central groove portion of the tread part 23 to cooperate with the reenforcing ribs 27 in imparting rigidity to the central portion of the tread part. The two disks 18, when assembled, generally simulate a wheel part such as that used to carry the ordinary pneumatic tire and in most instances, having due regard to size, etc., ordinary pneumatic tire-carrying wheel-parts may be utilized in this form of press-wheel structure.

Figure 3 illustrates another form of the invention in which the wheel structure includes a central hub 30 formed with an integral annular flange 31 provided with a plurality of transverse bores 32. The flange 31 has opposite radial faces 33 to which are secured respectively two flexible combination wheel body and tread parts 34. Each wheel part 34 is preferably formed of rubber and comprises a radial flange or disk part 35 of sufficient rigidity to carry the required load and a flexible outer annular tread part or band 36. The wheel parts 34 are secured to the flange 31 of the hub 30 by a plurality of bolts 37 passed through the transverse bores 32 and through the radial flange portions 35. The thickness of the flange 31 provides for axial spacing of the wheel parts 34 and the outer annular tread surfaces of the bands 36 are properly disposed and simulate the rims or tread parts of a conventional press wheel structure.

As previously mentioned it is an important object of the present invention to provide flexible tread bands for a conventional press-wheel structure. In the form of the invention illustrated in Figure 4 this object has been achieved without materially altering a conventional press-wheel. Such a press-wheel ordinarily, as illustrated, includes a central hub 40, a plurality of radially extending spokes 41, and a plurality of transverse support members 42 secured respectively to the spokes 41. This structure comprises the wheel body part which in an ordinary press-wheel carries annular metal rims or bands. In a preferred form of the invention wherein flexible or rubber tread bands have been mounted on a conventional wheel structure, the ordinary metal bands have been removed and a pair of comparatively narrow, annular rings 43 have been substituted therefor, the rings being mounted on the transverse supporting members 42 and disposed in axially spaced relation on the wheel body part. Each ring preferably has its axially opposite and radially outermost edges beveled, as at 44.

Two annular tread parts or bands 45 are mounted respectively on the rings 43 and are preferably secured thereto by securing means in the form of rivets 46, which may serve also to secure the rings to the transverse supporting members 42. Each band 45 is preferably formed of rubber of uniform thickness and is considerably wider than the ring to which it is secured. The rounded or beveled edges of the rings 44 cooperate with the flexibility of the bands 45 by permitting the latter to flex thereover as the wheel is operated over the ground. In this manner a central portion of each band 45 is comparatively rigid while the outer portions of each band have a desirable amount of flexibility providing for effective functioning when used in conjunction with the planter.

From the foregoing description of the structure shown in Figure 4, it will be seen that improved and desirable flexible tread bands have been advantageously applied to a press-wheel structure of the conventional type. The structure illustrated provides for a considerable difference in widths between each band 45 and each ring 43, thus permitting the aforesaid flexing of the band over the beveled edges 44 of the rings 43.

In all forms of the invention preferred structures have been illustrated for providing a press-wheel structure having flexible tread portions disposed in axially spaced relation for accomplishing desirable results in planting. The tread parts in all cases are preferably formed of uniform thickness and reenforced where desired to provide for easy manufacture and assembly of the wheel structures. It will be appreciated, of course, that numerous modifications and alterations may be made in the preferred forms illustrated without departing from the spirit and scope of the invention as defined in the appended claims.

What is claimed is:

1. A press-wheel structure comprising a central wheel part and an annular tread part, said tread part being secured to the wheel part and formed to adapt the wheel for operation over ground wherein ground surfaces and the wheel axis are non-parallel, said tread part comprising a pair of axially spaced inclined tread portions, each in the form of a strip of flexible material of substantially uniform thickness, and each having an outer tread surface the section of a cone having the wheel axis as its axis.

2. A press-wheel structure comprising a central wheel part and a pair of annular, axially spaced tread portions carried by the wheel part to adapt the wheel for operation over ground wherein ground surfaces and the wheel axis are non-parallel, each comprising a substantially uniformly thick ring formed of flexible material and having an outer surface the section of a cone having the wheel axis as its axis.

3. A press-wheel structure comprising a central wheel part and an annular tread part carried thereby to adapt the wheel for operation over ground wherein ground surfaces and the wheel axis are non-parallel, said tread part being formed of flexible material and comprising two axially spaced, annular tread portions, each in the form of a strip of flexible material of substantially uniform thickness, and each having annular tread surfaces inclined radially inwardly and toward each other.

4. A press-wheel structure comprising a rigid, central wheel part and a flexible, annular tread part carried thereby, the tread part comprising a pair of axially spaced, axially and radially inclined wing portions consisting of flexible bands of substantially uniform thickness.

5. A press-wheel comprising a hub part, a pair of axially spaced disks carried by the hub, and a pair of annular tread parts carried respectively by the disks, each tread part being formed of flexible material and having an annular tread surface formed as the section of a cone having the hub axis as its axis.

6. A press-wheel structure comprising a wheel part and a pair of tread parts carried thereby, each tread part consisting wholly of flexible material and comprising a radial flange portion and an integral annular tread portion, the flange portions of the tread parts being secured to the wheel part in axially spaced relation, the tread portion on each part extending radially and axially outwardly from the flange portion and having an annular tread surface the section of a cone formed about the wheel axis.

7. A press-wheel structure comprising a central hub part, a pair of disks carried by the hub and having axially spaced tire supporting portions, and a tread part carried at said portions by the disks, said tread part comprising a pair of annular, axially spaced tread portions formed of flexible material and having respectively annular tread surfaces formed as the section of a cone having the hub axis as its axis.

8. A press-wheel structure comprising a wheel part and a tread part carried thereby, said tread consisting wholly of flexible material and comprising a central portion engaging the wheel part and a pair of integral, axially and radially outwardly extending, annular tread portions, said tread portions being thus disposed in axially spaced relation on the wheel part, each having an annular tread surface the section of a cone formed about the wheel axis.

9. A press-wheel structure comprising a wheel part having its periphery formed with a tread part receiving portion, and a tread part formed of flexible material and comprising an annular central portion fitting the receiving portion on the wheel part and a pair of integral, axially spaced, annular tread portions respectively extending axially at each side of the central portion.

10. A press-wheel structure comprising a hub, a wheel part including a pair of separable disk members secured together and to the hub, each disk member having its periphery formed with a pair of annular, radially outwardly extending flanges, said pair of flanges forming a tread part receiving groove, and a tread part formed of flexible material and comprising an annular central portion fitting the groove formed by the disk member flanges and a pair of integral, axially spaced annular tread portions respectively extending axially at each side of the central portion.

11. A press-wheel structure comprising a wheel part and a tread part carried thereby, said tread part consisting wholly of flexible material and comprising a central portion engaging the wheel part and a pair of integral, axially and radially outwardly extending, annular tread portions, said tread portions being thus disposed in axially spaced relation on the wheel part, each having an annular tread surface the section of a cone formed about the wheel axis, said tread part including integral reenforcing ribs between the central and tread portions.

12. A press-wheel structure comprising a central wheel part having a pair of axially spaced rings, and a pair of flexible tread bands carried respectively by the rings, each having an outer surface the section of a cone about the wheel axis.

13. A press-wheel structure comprising a central wheel part having a pair of axially spaced rings, and a pair of annular, rubber tread parts substantially uniformly thick carried respectively by the rings, each having an outer surface the section of a cone about the wheel axis.

14. A press-wheel structure comprising a central wheel part having a pair of axially spaced rings, each having an annular surface the section of a cone formed about the wheel axis, and a pair of annular, flexible tread strips of substantially uniform thickness carried respectively by the rings and each having an annular tread surface the section of a cone formed about the wheel axis.

15. A press-wheel structure comprising a central wheel part having a pair of axially spaced rings, each having a peripheral surface the section of a cone formed about the wheel axis, each ring having its opposite axially and radially outermost edges beveled, and a pair of flexible tread bands respectively fitting the peripheral surfaces of the rings, each band being comparatively wider than its respective ring and overlying said beveled edges.

16. A flexible tread for a press-wheel structure having a central, spoked wheel part, a plurality of circumferentially spaced rim-supporting members, and a pair of axially spaced rims, said tread comprising a pair of annular, rubber tread strips secured respectively to the rims, each strip being comparatively wider than a rim and having its edges overhanging the edges of the respective rims to permit flexing of edges of the strip radially inwardly of said rim.

17. A press-wheel structure comprising a central wheel part having a pair of axially spaced rings, each having a comparatively smooth peripheral surface, and a pair of flexible tread bands respectively fitting the peripheral surfaces of the rings, each band being comparatively wider than its respective ring and having its edges overhanging the edges of the respective rings to permit flexing of edges of the strip radially inwardly of said ring and each band having a peripheral surface the section of a cone formed about the wheel axis.

18. A flexible tread for a press-wheel, including a pair of axially spaced, axially and radially inclined and radially inwardly converging rubber tread bands.

19. A press-wheel structure comprising a central wheel part and an annular tread part, said tread part including a pair of axially and radially inclined, flexible tread rings arranged on the wheel part with their axially innermost edges in axially spaced relation.

20. A press-wheel structure comprising a central, metal wheel part and an annular, rubber tread part, said tread being substantially V-shaped in cross-section.

EDWARD L. RIETZ.